(12) United States Patent
Dragone (10) Patent No.: US 8,594,473 B2
(45) Date of Patent: Nov. 26, 2013

(54) OPTICAL ROUTER WITH STATIONARY RESPONSE AND INCREASED NUMBER OF CHANNELS

(76) Inventor: Corrado Pietro Dragone, Little Silver, NJ (US)

( * ) Notice: Subject to any disclaimer, the term of this patent is extended or adjusted under 35 U.S.C. 154(b) by 894 days.

(21) Appl. No.: 12/660,047

(22) Filed: Feb. 20, 2010

(65) Prior Publication Data

US 2011/0206318 A1 Aug. 25, 2011

(51) Int. Cl.
*G02B 6/34* (2006.01)
*G02B 6/28* (2006.01)

(52) U.S. Cl.
USPC ............................................. 385/37; 385/24

(58) Field of Classification Search
USPC .................................................. 385/24, 37
See application file for complete search history.

(56) References Cited

U.S. PATENT DOCUMENTS

| 5,002,350 | A | 3/1991 | Dragone |
| 5,136,671 | A | 8/1992 | Dragone |
| 5,488,680 | A | 1/1996 | Dragone |
| 6,782,163 | B2 * | 8/2004 | Dragone ........................ 385/37 |
| 6,873,766 | B2 | 3/2005 | Dragone |
| 7,010,197 | B2 | 3/2006 | Doerr |
| 7,068,888 | B1 | 6/2006 | Dragone |
| 7,283,700 | B2 | 10/2007 | Dragone |

\* cited by examiner

*Primary Examiner* — Ryan Lepisto
*Assistant Examiner* — Erin Chiem (57) ABSTRACT

A planar optical router consisting of two stages performing stationary imaging has advantages of reduced size, increased number of channels and reduced crosstalk. In one embodiment, each stage of the router includes a waveguide grating, and the router produces several sets of interleaved images, with the property that different sets are characterized by different diffraction orders of the two gratings. The new arrangement substantially increases the number of output waveguides, as compared to previous arrangements using only one set of images, characterized by the same order of the output stage. Moreover, since adjacent sets are characterized by different orders, crosstalk is substantially reduced. In a second embodiment, the number of output waveguides is further increased by including two gratings in the second stage.

4 Claims, 6 Drawing Sheets

*(Prior Art)*

OPTICAL ROUTER WITH STATIONARY RESPONSE AND INCREASED NUMBER OF CHANNELS

FIELD OF THE INVENTION

This invention relates to optical frequency routers in optical systems and, more particularly, to optical routers with maximally flat passbands.

BACKGROUND OF THE INVENTION

An important function that must be provided in optical networks is wavelength routing. In particular, wavelength routing is needed at each node, in order to combine and separate different wavelength channels. Typically, the router is realized in integrated form by using a waveguide grating, but a limitation of this router is its narrow bandwidth, which is typically much smaller than the channel spacing. This limitation is caused by the strong wavelength dependence of the output images produced by the grating, and it can be eliminated by replacing the grating with a combination of two gratings of opposite dispersions, as shown in U.S. Pat. No. 7,010,197 B2 which issued on Mar. 7, 2006, and U.S. Pat. No. 7,283,700, which issued on Oct. 16, 2007. By this technique the router produces, at the location of each output waveguide, a stationary image resulting in nearly maximum transmission having bandwidth nearly equal to the channel spacing. However, an undesirable feature of this technique is the large size of the router. In particular, the first patent requires between the two gratings many waveguide lenses, one for each output waveguide, and therefore this design is only feasible if the number N of output waveguides is small. On the other hand, only one lens is required by the second patent, but an undesirable feature in this case is the large spacing of the output waveguides. Therefore, also in this case, the router is only feasible if N is small.

Accordingly, the present patent proposes a new design that substantially increases the number of waveguides, without substantially increasing the size of the router. In the new design, a single waveguide lens is included between the two gratings, as in the previous patent. Now, however, each output waveguide is replaced by a set of several waveguides receiving different diffraction orders of the output stage.

SUMMARY OF THE INVENTION

The primary objective of my invention is to increase the number of channels in a wavelength router consisting of two waveguide gratings and a waveguide lens connected between the two gratings. In the prior art, the transmission coefficients of this arrangement were all characterized by the same diffraction order of the output stage and, as a consequence, the router was characterized by a set of N widely spaced output waveguides. Instead, in the present patent, several orders of the output stage are used. The above set of N output waveguides is therefore replaced by p interleaved sets, each corresponding to a particular order of the output stage, and each including N waveguides. By this technique, the total number of channels (of output waveguides) is increased, by a factor p, without substantially changing the size of the output grating. Two basic properties of the new arrangement are that the output waveguides are closely spaced, and consecutive output waveguides are characterized by different orders of the output grating.

DETAILED DESCRIPTION OF VARIOUS ILLUSTRATIVE EMBODIMENTS

In the following description, the first digit in each element designation refers to the figure in which that element is located (e.g., 107 is located in FIG. 1). Additionally, the remaining digits are the same for similar elements occurring in different Figures.

Waveguide Grating Router Description

Figure 1:
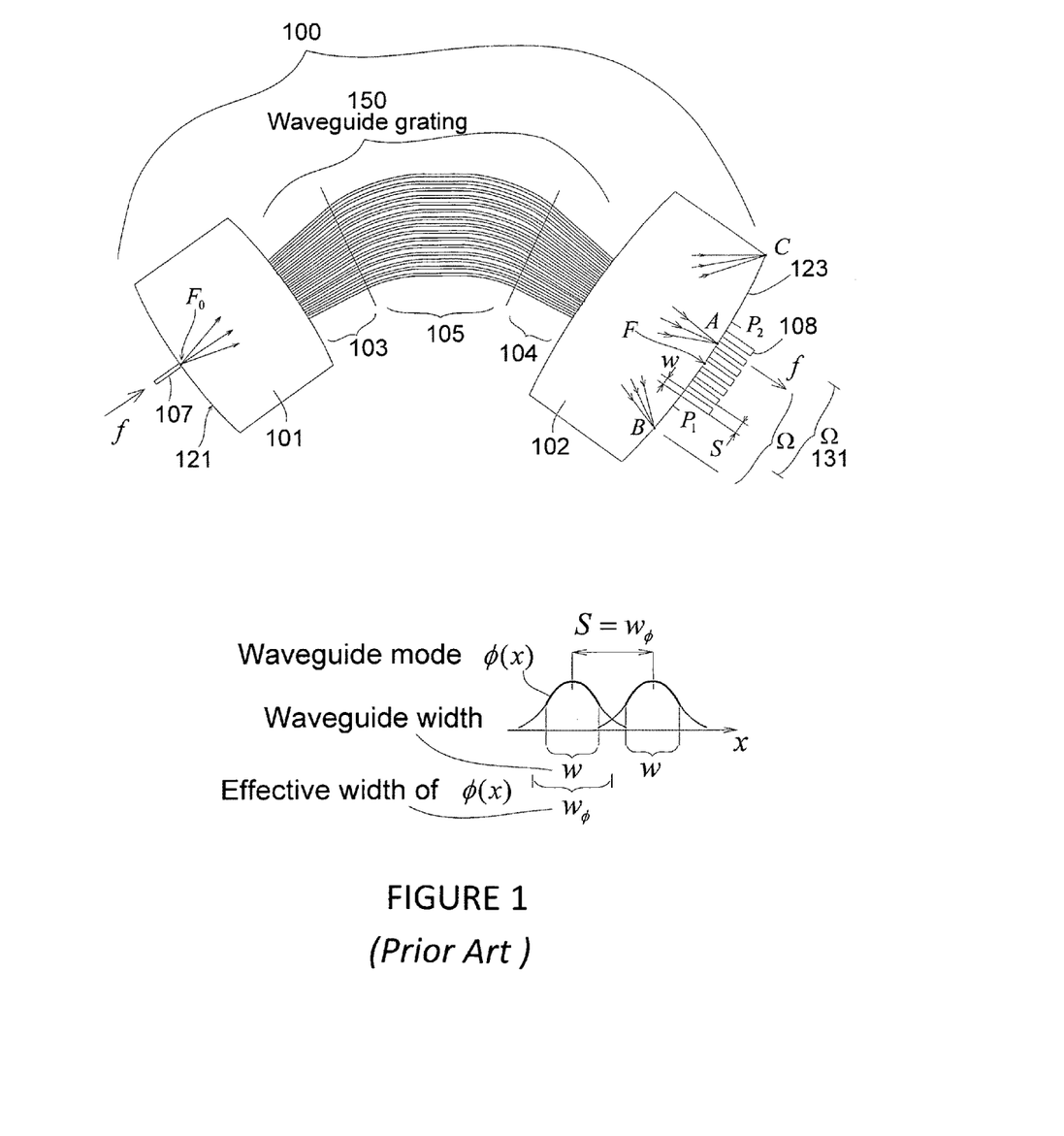
FIG. 1 illustrates the basic prior art geometry of a waveguide grating router. Also shown, in the bottom insert, is the mode $\phi(x)$ of a typical waveguide. The effective width $w_\phi$ of the mode determines the minimum spacing S of adjacent output waveguides of width w.

FIG. 1 shows the basic structure of a prior art imaging arrangement 100 of the type used in this invention. Note the imaging arrangement will also be referred to herein as a router. The imaging arrangement 100 is described in U.S. Pat. No. 5,002,350, issued on Mar. 26, 1991, and U.S. Pat. No. 5,136,671, issued on Aug. 4, 1992, The imaging arrangement 100 includes an input section 101 and an output section 102 spaced apart and interconnected by a grating 150 consisting of an appropriate plurality of optical waveguide arms 105 connected between two periodic arrays 103, 104 of radial waveguides. The input and output sections typically are each free-space slab waveguides, such as star couplers, and the arrangement has the property that wave energy applied by an input waveguide 107 acting as a point source forms a plurality of output images, of which three are shown as A, B, C in FIG. 1. The optical waveguide arms 105 typically are thin narrow layers (planar strips) of silica core supported on a planar silicon wafer, as known in the art.

In a conventional imaging arrangement or router, the input and output ports are connected to the input and output sections 101 and 102 along portions of two curves, that contain the input and output foci $F_0$ and F, and they are typically referred to as the input 121 and output 123 focal circles. For simplicity, FIG. 1 shows only one input 107 and several output 108 ports.

The result is a router that produces a frequency dependent output image of each input signal. The location of each output image is determined by its frequency f and, therefore, signals of different frequencies from a particular input port give rise to separate images that can be received by different output ports. Typically, optical fibers are used for applying input signals to the input ports and for extracting output signals from the output ports 108. Several output ports are needed in order to transmit signals to different destinations. Similarly, several input ports may be needed, in order to receive signals from different input fibers. In frequency division optical networks, the different frequencies would represent different communication channels.

The properties of the arrangement of FIG. 1 are best described next by considering its imaging properties in response to an input signal of variable frequency f applied to the input waveguide 107. The input signal in FIG. 1 is radiated from the waveguide location towards the receiving apertures of the radial waveguides 103 connected to the arms 105 forming the grating 150. As discussed earlier, there would be an appropriate number of arms in the grating 150. At a particular input frequency, each arm receives a component of the input signal. The signal is therefore split into many components, each traveling along a particular arm. Each arm applies to its component an appropriate phase shift, which is frequency dependent, and it is proportional to the optical path length of the arm. In a conventional router, successive arms are characterized to a good approximation by a constant path length difference. Then, one finds that the various signal components radiated by the arms towards the output curve, all add in phase at certain locations on the output curve 123 shown in FIG. 1. As a result, several images A, B, C of the input signal are produced on the output curve 123. These images represent different orders of the grating and they have three basic properties. First, their locations vary with the frequency f. Second, their intensities also vary, and they are determined by the radiation characteristics of the periodic array 104. Third, the images are equally spaced with spacing $\Omega$ determined by the angular spacing $\alpha$ of the array elements, $$\Omega = \frac{\lambda}{\alpha} = \frac{c}{f}\frac{1}{\alpha} \quad (1)$$

where $\lambda$ denotes the wavelength, approximately equal to a constant c divided by f. Of greatest importance in a conventional router is the central image A of highest intensity. This is the image closest to the focal point F of the arms and it is called the principal image. This image is produced inside the central zone, which is an interval 131 of width $|P_1P_2|=\Omega$ centered at F. The remaining images (produced by different orders) such as B, C are produced outside the central zone. These secondary images typically have appreciably smaller intensity in all cases except when they are close to the boundaries $P_1$, $P_2$ of the central zone. In a conventional router, all secondary images produced outside the central zone (e.g., B and C of FIG. 1) are considered useless and so undesirable. These unwanted images reduce the power transferred to the principal image and, therefore, they reduce the grating efficiency. In particular, they cause substantial efficiency variation in the central zone $P_1P_2$, particularly in the regions close to the edges $P_1$ and $P_2$. As a consequence, in conventional routers, the output waveguides 108 are located in the central region where the grating efficiency is close to unity.

Note, since the principal image A is defined as the closest image to the focal point, the central zone width $P_1P_2$ is simply equal to the spacing $\Omega$ of the various images. Moreover, an input signal of variable frequency will cause the principal image location to vary cyclically in the central zone, with a discontinuous jump by $-\Omega$ occurring from each cycle (each order) to the next.

In a conventional router, all the output ports or waveguides are located inside the central zone 131 (which in FIG. 1 represents the field of view $P_1P_2$ of the router) and receive only the images produced in the central zone. As shown in FIG. 1, the output waveguides 108 are closely spaced, with spacing S slightly larger than the waveguide width w. Note the waveguide spacing determines in FIG. 1 the channel spacing, and it is therefore important to minimize S for a given waveguide width w by choosing for S the smallest possible value, without causing appreciable mutual coupling (crosstalk) between adjacent waveguides. The bottom insert of FIG. 1 shows the modes of two adjacent waveguides. The waveguide spacing S must be large enough to insure negligible mutual coupling, and the smallest S satisfying this condition is determined by the effective width $w_\phi$ of the waveguide mode $\phi(x)$.

The input signal in FIG. 1 is efficiently transmitted to a particular waveguide at those frequencies for which the principal image location A coincides with the waveguide location. As pointed out earlier, A is defined as the particular image inside the central zone $P_1P_2$. Therefore the variation of A is a periodic (cyclic) function of the signal frequency. In each period, the variation exactly covers the entire central zone $P_1P_2$. As a result, the transmission coefficient (to a particular output waveguide) has periodic behavior consisting of equally spaced maxima. Each maximum corresponds to a frequency for which the image A coincides with the output waveguide location. The period, given by the frequency spacing between maxima, is called the free-spectral range. The period has, in general, slightly different values at different locations in the central zone and, therefore, different waveguides in FIG. 1 will be characterized by slightly different periods. In the following, $\Delta f$ will denote the central period produced, at the center (the focal point F) of the central zone, in response to a signal applied to $F_0$. Then, a waveguide connected to the focal point F is characterized by a set of equally spaced frequencies $f_i$ of maximum transmission. These frequencies, transmitted by the grating from the input focal point $F_0$ to the output focal point F will be called the characteristic frequencies of the grating. Each of these frequencies is determined by a particular order $Q_i$ of the grating, and $$f_i = f_0 + i\Delta f, \ Q_i = Q_0 + i \ (i=0, \pm 1, \dots) \quad (2)$$

where $f_0$ will be called the center frequency of the grating, $Q_0$ denotes the corresponding order, $\Delta f$ will be called the free-spectral range of the router, and the parameters $\Delta f$, $f_0$, $Q_0$ are related by the well known relation $$\Delta f = \frac{f_0}{Q_0} = \frac{f_i}{Q_i} \quad (3)$$

Another important relation is obtained by considering in FIG. 1 the variation of the output image A as a function of the wavelength. One finds that the wavelength derivative D of the image coordinate is simply equal to $$D = Q\frac{\Omega}{\lambda} \quad (4)$$

where Q is the order of the image and the ratio $\Omega/\lambda$ according to the expression (1) is a constant independent of the signal frequency.

Figure 2:
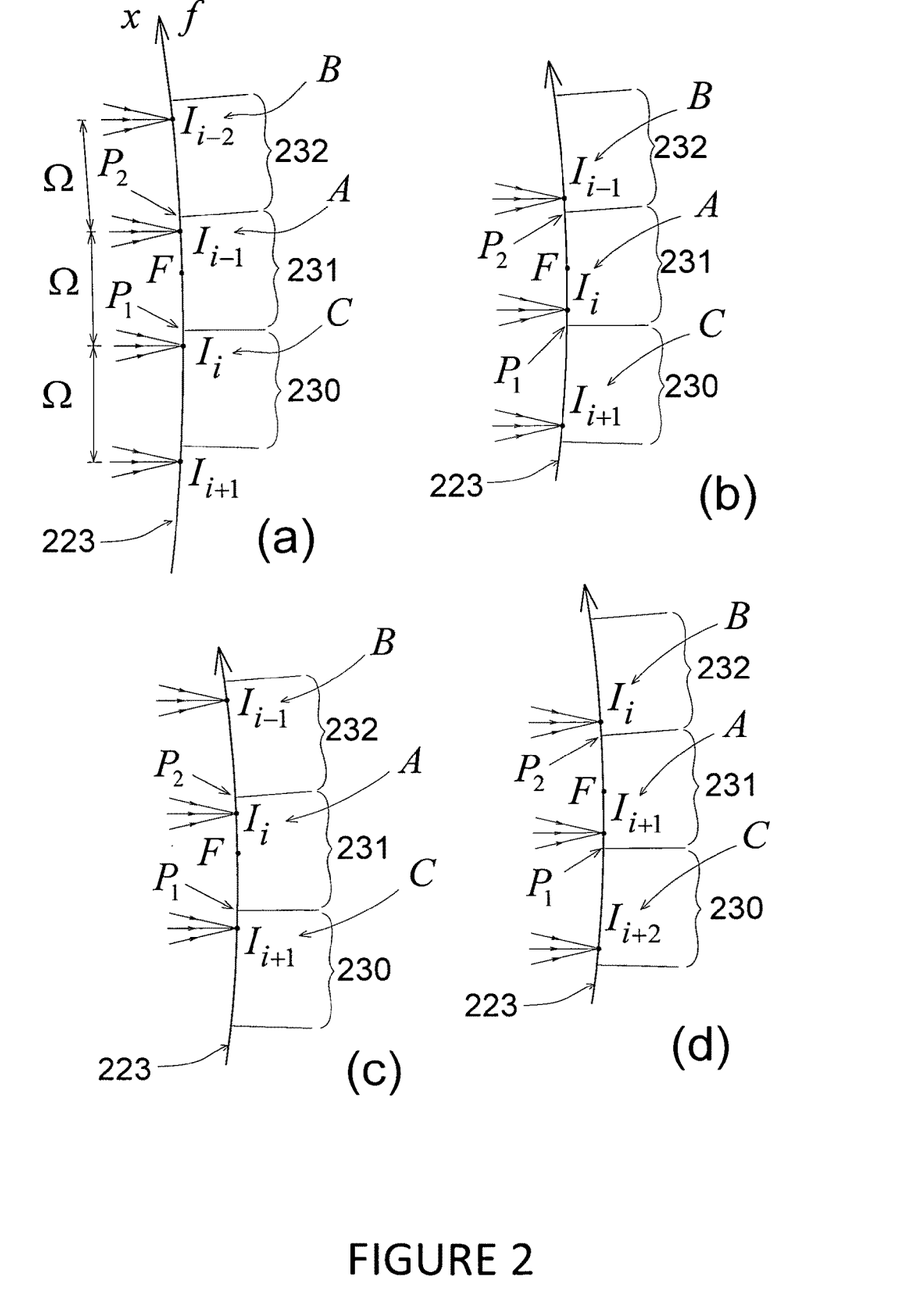
FIG. 2 illustrates the cyclic behavior of the images A, B, C produced in the output zones 231, 232 and 230 of the router of FIG. 1.

Next consider the router response to an input signal of variable frequency. FIG. 2 shows four examples (a, b, c, d) of the images respectively produced on the output circle 223 by four consecutive frequencies. Note $I_i$ denotes the i-th image of order $Q_i$ and $\Omega$ is the image spacing determined by the angular period $\alpha$ of the periodic array 104. Typically, by optimizing the efficiency of the periodic array 104, most of the signal power is transferred to the principal image A located in the central zone 231, and the remaining power is primarily transferred to the two secondary images located on either side of the central zone. These three images are respectively located inside three zones 230, 231, and 232 of widths equal to $\Omega$ and they are characterized, in each zone, by cyclic variation. Each cycle is produced by a particular image, of a particular order, and it covers the entire zone. Consider for instance the central zone 231. Initially, in insert (a), the principal image A inside the central zone $P_1P_2$ is produced by the image $I_{i-1}$ of order $Q_{i-1}$, and the image $I_i$ of order $Q_i$ is a secondary image C produced inside the secondary zone 230. However, by increasing the frequency, the image $I_{i+1}$ exits the central zone, thus becoming a secondary image B in the secondary zone 232 as shown by insert (b). At the same time, the secondary image $I_i$ enters the central zone, thus becoming the new principal image. Notice, at the end of each cycle, produced by a particular order, the principal image exits from the central zone at $P_2$ while at the same time a new cycle starts at $P_1$ (see inserts (c, d)). Thus, at the end of each cycle, the principal image A discontinuously jumps from $P_2$ to $P_1$, and a similar behavior occurs in all other zones.

To summarize, the image location in the central zone $P_1 P_2$ is a cyclic function of the input frequency. Each cycle is determined by a particular order $Q_i$ of the grating and it covers the entire interval $P_1 P_2$. At the end $P_2$ of a cycle, the order $Q_i$ increases by one (thus becoming $Q_{i+1}=Q_i+1$) and a new cycle starts at the other end $P_1$. Notice, any particular location A in the central zone $P_1 P_2$ is periodically revisited by the output image with a constant frequency period.

Note the efficiency (the image intensity) in each zone is a function of the image distance from the focal point F and, as pointed out earlier, its variation is determined by the radiation characteristics of the periodic array 104. As pointed out earlier, the central zone is typically characterized by a central region of nearly maximum intensity, and it is generally advantageous to maximize the width of this region by including suitable transitions in the periodic array as shown in U.S. Pat. No. 7,068,888 issued on Jun. 27, 2006, and U.S. Pat. No. 6,873,766 issued on Mar. 29, 2005. Then, the width of the above central region typically varies between 50% and 80% of the central zone. Typically, in a router, the output waveguides are located in the above central region, and therefore their number N is smaller, by a factor $\gamma<0.8$, than the maximum value $N_{max}$ allowed by the central zone width. Thus in FIG. 1

$$N=\gamma N_{max} \quad (5)$$

where $N_{max}=\Omega/S$ and $\gamma<1$, and similar relations will apply to the new routers considered here.

Stationary Imaging

In FIG. 1, the location of each output image is a function of the input frequency, and therefore the router is characterized by substantial loss variation in each passband. It is therefore desirable for many applications to substantially reduce this variation by using the technique described in U.S. Pat. No. 5,488,680 which issued on Jan. 30, 1996, U.S. Pat. No. 7,010, 197 B2 which issued on Mar. 7, 2006, and U.S. Pat. No. 7,283,700 B2, which issued on Oct. 16, 2007. By this technique, the above image variation is essentially eliminated by using a combination of two stages characterized by opposite dispersions, and the router then produces, at each output waveguide location, a stationary output image producing a maximally flat response in the output waveguide. However, a limitation of the arrangements described in the above patents is their large size. In particular, the arrangement proposed in U.S. Pat. No. 7,010,197 B2 requires a large number of lenses, one for each output waveguide, and therefore this arrangement is only feasible if the number N of output waveguides is small. On the other hand, U.S. Pat. No. 7,283,700 describes an arrangement using a single lens, as shown in FIG. 3, but an undesirable feature of this arrangement is again its large size, caused in this case by the large spacing S of the output waveguides, as discussed next.

Figure 3:
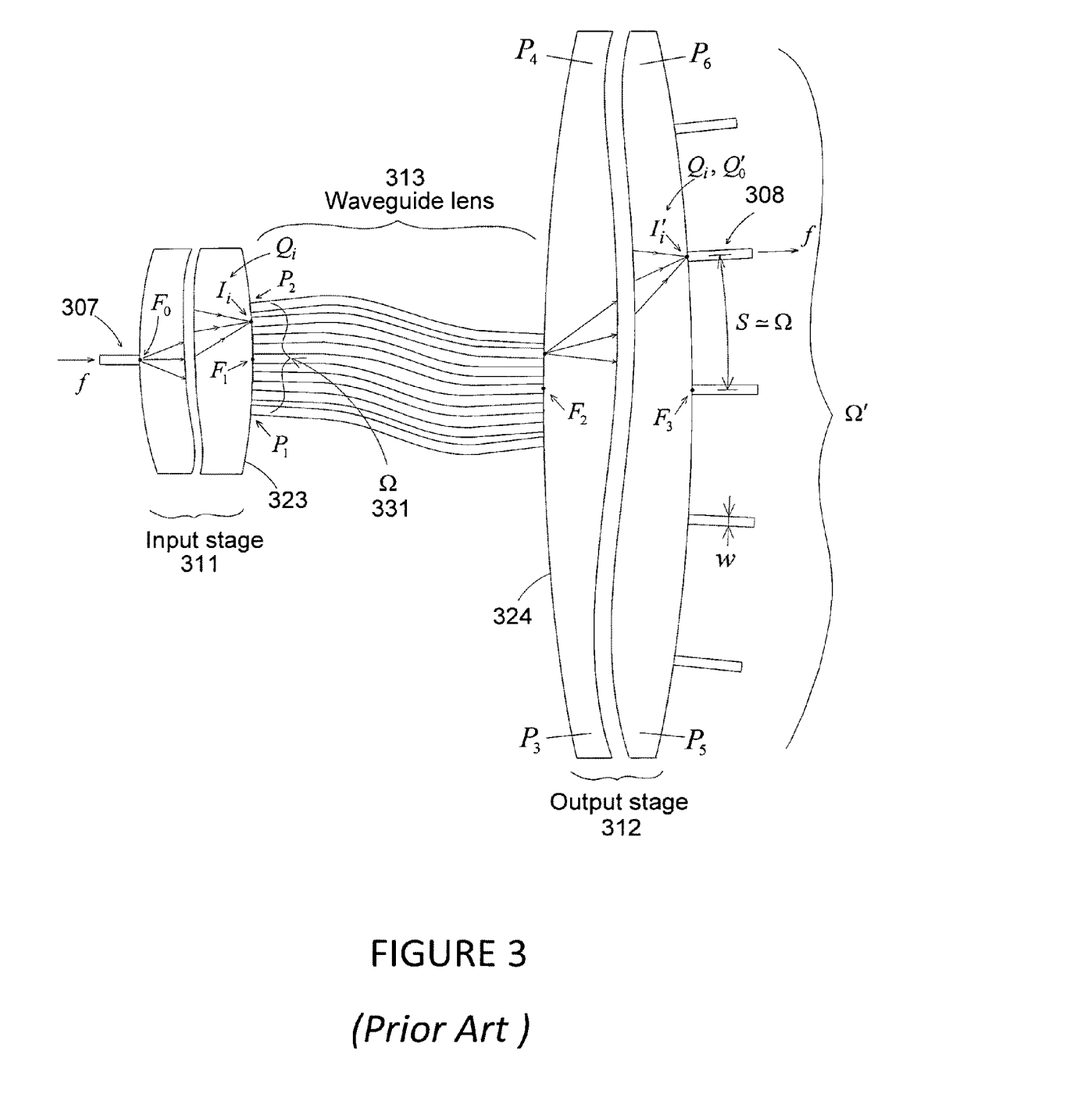
FIG. 3 shows a prior art router featuring a set of widely spaced waveguides 308, all characterized by the same order $Q_0'$ of the output stage.

The prior art arrangement of FIG. 3 consists of two stages 311, 312 and a single waveguide lens 313 connected between the two stages. Each stage is formed by a waveguide grating router, as shown in FIG. 1, and the waveguide lens provides efficient transmission between the focal circles 323 and 324 of the two gratings (not shown). The two stages are essentially characterized by opposite dispersions, and therefore the complete arrangement features a set of stationary output images, produced at the locations of the various output waveguides. In this arrangement the various passbands are all produced by a particular cycle (a particular order $Q_0'$) of the output stage. Thus, the i-th cycle of the input stage 311 produces an image $I_i$ of order $Q_i=Q_0+i$, and this image is transferred by the waveguide lens to the output stage 312, whose cycle of order $Q_0'$ then produces a stationary output image $I_i'$. In this arrangement, the lens aperture 331 is approximately equal to the central zone width $\Omega$ of the first stage. Each cycle of the input stage produces, over the lens aperture, a variable image $I_i$, which is transmitted by the lens to the output stage, which in turn produces an output stationary image $I_i'$ at a particular waveguide location inside the central zone $P_5P_6$ of the output circle. In this arrangement, since each input cycle in FIG. 3 ends with a discontinuous jump from $P_2$ to $P_1$, the output stationary image correspondingly jumps, at the end of each input cycle, to the next output waveguide. Therefore the separation S of the output waveguides is determined by the lens aperture. More precisely, S is essentially the product of the lens aperture width multiplied by the magnification factors of the lens and the output stage. As a consequence, since the lens typically includes many waveguides, the output waveguides separation S is much larger than the waveguide width w. Therefore, an important limitation in FIG. 3 is the large size of the output stage.

Figure 4:
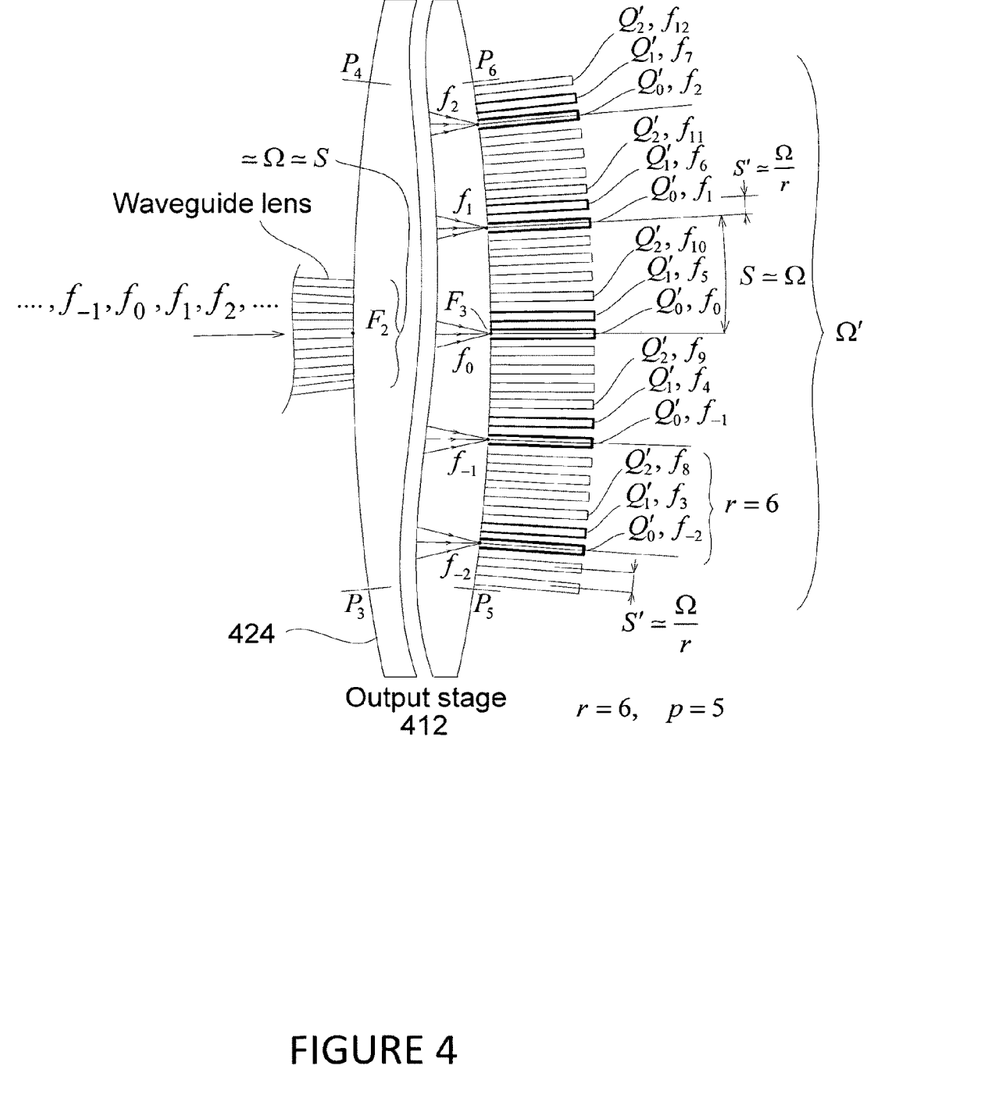
FIG. 4 shows the output stage geometry of the new router satisfying condition (6). The output stage includes r interleaved sets of output waveguides, and each set receives the output images produced by a particular order $Q_j'$ of the output stage.

The above problem is a consequence of only using in FIG. 3 one order $Q_0'$ of the output stage. In the present patent, this problem is solved by using instead a sequence of r consecutive orders $Q_j'$ (defined later by (7)) as shown in FIG. 4 for r=6. The router then transmits to the output waveguides r sets of stationary images. Each set is produced by a particular order $Q_j'$ of the output stage, and the spacing S of its images is again determined, as in FIG. 3, by the central zone width $\Omega$ of the first stage. Moreover, the orders of the two stages are properly chosen so as to cause the output waveguides to be uniformly spaced by S/r as shown in FIG. 4. To this purpose, each pair of consecutive sets of orders $Q_j'$ and $Q^{j+1'}$ must be displaced from each other by S/r, and it is shown that this condition is accurately realized by simply choosing $$\frac{Q_0}{Q'_0} = p - \frac{1}{r} \quad (6)$$

where p is the number of images in the set of order $Q_0'$. By this technique, the output waveguides are uniformly spaced to a good approximation. Moreover, as shown in FIG. 4, consecutive waveguides are now characterized by different orders $Q_j'$. One also finds that r consecutive cycles of the output stage (consecutive values of $Q_j'$) produce a total of rp−1 stationary images, spaced by S/r. Thus, by this technique, the number of waveguides is approximately increased by a factor r and, at the same time, the waveguide spacing is reduced by the same factor, without substantially changing the size of the output stage. Another important property is obtained by considering two sets of images characterized by different orders $Q_j'$. Then, if the orders of the two sets differ by an integer multiple of r, one finds that the two sets are (approximately) produced at the same locations, and this is shown to imply that the router frequency response in each output waveguide is periodic, with period rΔf. Next the significance and implications of condition (6) are further explained by giving two different derivations, both based on the cyclic behavior of the two stages.

A basic property of the arrangements of FIGS. 3, 4 is that each output waveguide location is simply determined by a particular characteristic frequency $f_i$ of the input stage. Each frequency $f_i$ is transferred by the lens to the input focal point $F_2$ of the output stage, as indicated in FIG. 4. Therefore, the locations of the various stationary images can be derived by simply applying to the focal point $F_2$ the characteristic frequencies $f_i$ as indicated in FIG. 4. Next, for simplicity, it will be assumed in FIGS. 3, 4 that the center frequency $f_0'$ of the output stage coincides with the center frequency $f_0$ of the input stage, in which case the output waveguides include a central waveguide located at the output focal point $F_3$, as in FIGS. 3, 4. This assumption simplifies the derivation of the above design condition (6), but it can be shown that this condition is valid in general, without the above assumption. Also notice that the same relations specifying the characteristic frequencies $f_i$ of the input stage also apply in FIGS. 3, 4 to the characteristics frequencies $f_j'$ the output grating. Thus, by assuming $f_0'=f_0$, $$[[f_j'=f_0+j\Delta f,\ Q_j'=Q_0'+j \quad (7)]]$$

$$f_j'=f_0+j\Delta f',\ Q_j'+Q_0'+j \quad (7)$$

where the central period Δf' (the free-spectral range) of the output stage is given by $$\Delta f' = \frac{f_0}{Q_0'} = \frac{f_j'}{Q_j'} \quad (8)$$

where $Q_j'$ denotes the order corresponding to the characteristic frequency $f_j'$. From the above expressions, taking into account the analogous expressions (2,3) obtained previously for the input stage, one finds that the ratio Δf'/Δf is equal to $$\frac{\Delta f'}{\Delta f} = \frac{Q_0}{Q_0'} \quad (9)$$

By using the above relations, the number p of stationary images produced by each cycle of the output stage can be determined in FIG. 4 as follows. Initially consider the arrangement of Fig. 3, and let the ratio $Q_0/Q_0'$ be approximated by its closest integer p, $$\frac{Q_0}{Q_0'} = p. \quad (10)$$

Then, according to condition (9), the free-spectral range Δf' of the output stage becomes an integer multiple of Δf, $$\Delta f'=p\Delta f, \quad (11)$$

and therefore each output cycle (each free-spectral range Δf') exactly produces p stationary images. Moreover, in this case the central transmission coefficient (transmitted to the central waveguide connected to the output focal point $F_3$) is periodic, with period Δf', since from equation (11)

$$f_j'=f_0+j\Delta f'=f_0+jp\Delta f=f_{pj} \quad (12)$$

and therefore, since the characteristic frequencies $f_{pj}$ of the input stage coincide with the characteristic frequencies $f_j'$ of the output stage, these frequencies are all transferred to the output focal point $F_3$. The router transmission coefficient in the central waveguide connected to $F_3$ is therefore periodic, with period Δf'. One can also verify that the same periodic behavior just derived for the central coefficient is also obtained, to a good approximation, for all other transmission coefficients in FIG. 3. Moreover, since according to condition (11) each period Δf' of the output stage includes p periods Δf of the input stage, one can verify that the router produces in each cycle (a particular order $Q_j'$) of the output stage a total of p stationary images, and therefore their spacing is approximately equal to $S=\Omega'/p$, where $\Omega'$ denotes the width of the output central zone of the output stage.

Next consider the arrangement of Fig. 4, characterized by the new design condition (6). One then obtains instead of conditions (10,11)

$$r\Delta f'=(rp-1)\Delta f \quad (13)$$

In this case, the central transmission coefficient, transmitted to the central waveguide, is again found to be substantially periodic, but its period (free-spectral range) is now rΔf'. Moreover, each period, according to the above expression, now includes rp−1 cycles of the input stage, and therefore it includes rp−1 characteristic frequencies $f_i$. As a consequence, each period includes rp−1 stationary images, produced at different locations of the output central zone $P_5P_6$, and one obtains the arrangement of FIG. 4. The total number of stationary images (the largest number of output waveguides that can be included in the central zone) is now approximately increased by a factor r, as compared to the number p obtained previously by assuming condition (11). Notice, as pointed out earlier, the actual number N of output waveguides included in FIG. 3 will be generally chosen smaller than the number p of stationary images, since only the central region of the central zone is generally characterized by acceptable efficiency. In this case, by using the above technique, the total number of waveguides will increase by a factor r. At the same time, the waveguide spacing will be reduced by about the same factor.

To summarize, the two routers of Figures 3,4 feature different designs. In Fig. 3, the router is characterized, according to Eq. (11) by Δf'=pΔf where Δf', Δf are the free-spectral ranges of the two stages, and the parameter p determines the number of output waveguides. Instead, the new design of Fig. 4 is characterized by rΔf'=(rp−1)Δf according to Equation (13) In the former case, the output waveguides are widely spaced and if p is an integer their number is equal to p. Instead, in the new design, the number of output waveguides can be as large as rp−1. As shown in Fig. 4 the output stage comprises r interleaved sets, of which each set except one includes p waveguides and, the remaining set, includes p−1 waveguides. Moreover, for each set of output waveguides, the corresponding set of passbands in Fig. 4 are all produced by a particular cycle(a particular order $Q_j'$) of the output stage. Moreover, for a particular order $Q_j'$ of the output stage, different passbands are produced by different orders $Q_j$(different cycles) of the input stage. Thus, for instance, it is shown in Fig. 4 that the cycle of order $Q_0'$is centered at the p characteristic frequencies $f_{-2}, f_{-1}, f_0, \ldots, f_2$ of orders $Q_{-2}, Q_{-1}, Q_0, \ldots, Q_2$of the input stage, and the cycle of order $Q_0'$ includes a total of p passbands, produced by p consecutive orders of the input stage. Also note, for applications requiring nearly maximum transmission efficiency for all passbands, only some of the above rp−1waveguides (those included in the central region of the output principal zone) may be included.

In the example of FIG. 4, the router is characterized by p=5, r=6 and the total number of waveguides is rp−1=29. In this arrangement, each output cycle, characterized by a particular order $Q_j'$ of the output stage, produces a set of stationary images, and each image is produced by a particular input cycle of order $Q_i$. Thus, for instance, the locations of the images of order $Q_0'$ are produced in FIGS. 3,4 by the p characteristic frequencies $$f_{-2}, \ldots, f_0, \ldots, f_2$$

which represent the center frequencies of the input cycles of orders $$Q_{-2}, \ldots, Q_0, \ldots, Q_2.$$

Similarly, the set of order $Q_1'$ is produced by the next p characteristic frequencies $$f_3, \ldots, f_5, \ldots, f_7,$$

and the corresponding input cycles have orders $$Q_3, \ldots, Q_5, \ldots, Q_7.$$

Moreover, as shown in FIG. 4, the two sets of images are approximately displaced from each other by S'=S/r.

Notice in FIGS. 3, 4 it is assumed, for simplicity that the lens is characterized by unity magnification, so that the input and output circles 323, 324 of the lens are characterized by the same waveguide spacing. Similarly, it will be next assumed that each stage is characterized by unity magnification, so that the input and output zones of each stage have the same width. Note however the above magnifications (of the lens and the two stages) do not affect the router performance. They are only assumed to simplify the following derivation. Then, a simple expression is obtained for the wavelength derivative of each output image. By assuming unity magnifications, this derivative becomes equal to the difference D'−D, where the two parameters D and D' are the contributions from the two stages, and one finds that stationary imaging is realized by simply specifying D'=D and one obtains, in the vicinity of the center frequency $f_0$, the condition $$\frac{\Omega}{\Omega'} = \frac{Q_0'}{Q_0} = \frac{\Delta f}{\Delta f'} \quad (14)$$

where the central zone widths $\Omega$, $\Omega'$ of the two stages are determined by equation (1) and therefore the ratio $\Omega/\Omega'$ is a constant (independent of the frequency). Therefore, from the above equation $$\frac{\Omega_0}{\Omega_0'} = \frac{Q_0'}{Q_0} \quad (15)$$

where $\Omega_0$, $\Omega_0'$ denote the values of $\Omega$, $\Omega'$ at the center frequency $f_0$. Notice the input and output central zones $P_3P_4$ and $P_5P_6$ of the output stage are centered respectively at the foci $F_2$ and $F_3$ of the output grating. Moreover, since unity magnification is assumed, the above central zones have the same width $Q'$.

Figure 5:
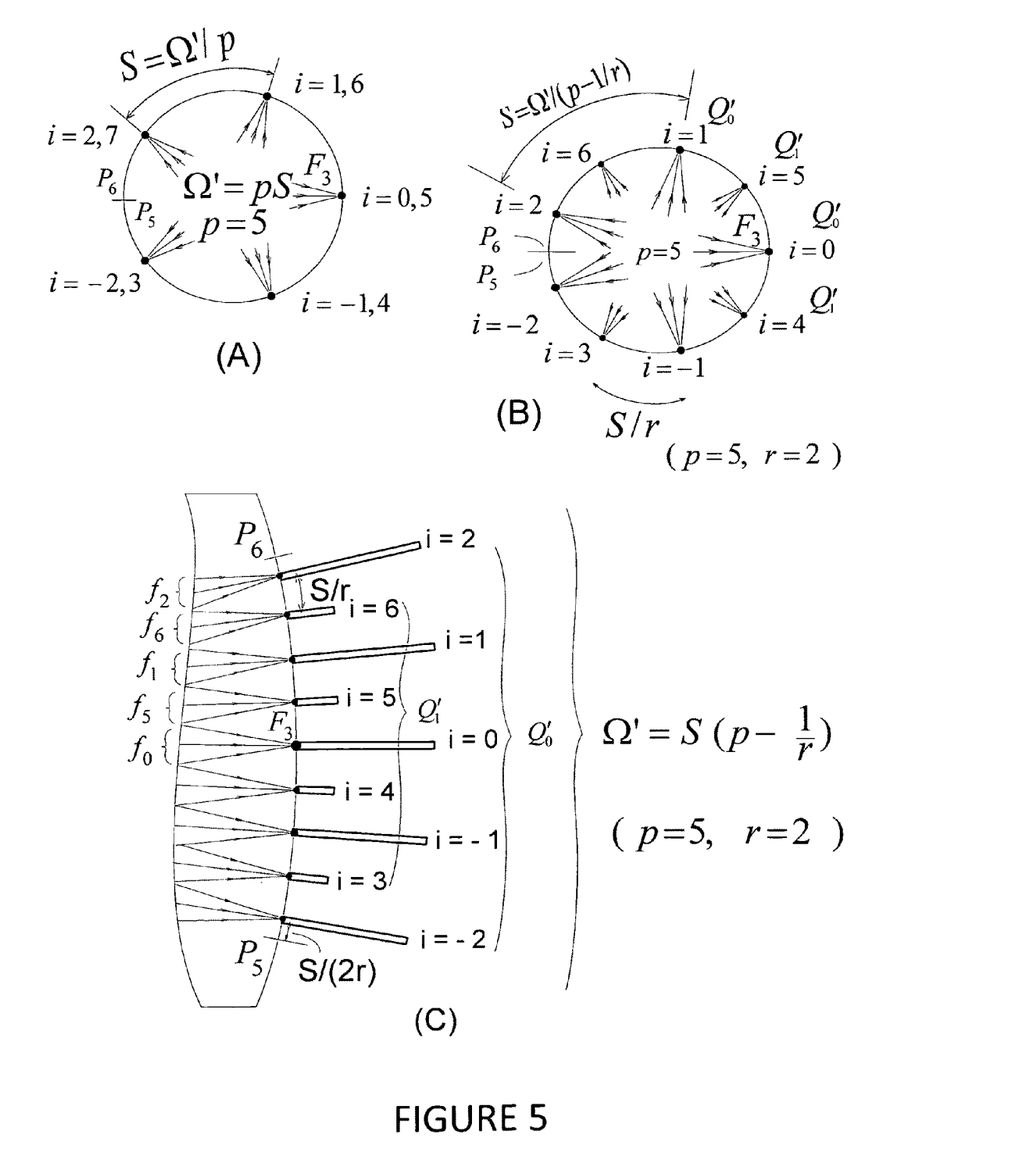
FIG. 5 shows two examples (A) and (B) of the output images produced by the two arrangements of FIGS. 3 and 4. In both cases the output central zone $P_5P_6$ is represented by a circle of length equal to the central zone width $\Omega'$. Also shown in (C) are the (two) interleaved sets of output waveguides obtained in case (B).

Next, consider the effect of condition (6) on the locations of the output images. Initially ignore the frequency dependence of the central zones of the two stages, in which case the output images in FIG. 3 are characterized by a constant spacing, equal to the width $\Omega$ of the central zone $P_1P_2$ of the input stage. Moreover let $\Omega$ denote in FIG. 3 the width of the output central zone $P_5 P_6$, and consider in FIGS. 3, 4 the output images produced, by the output stage, by the sequence of frequencies $f_i$ applied to the focal point $F_2$. The locations of these images vary cyclically in the output central zone $P_5 P_6$, with a discontinuous jump by $-P_5 P_6$ occurring from each cycle (each order $Q_j'$) to the next. Here it is convenient to remove this jump by representing the cyclic behavior of the output stage on a circle, obtained by bending the central zone segment $P_5 P_6$ and joining together the two ends as shown by inserts (A,B) of FIG. 5. Then, on this circle, the frequencies $f_i$ produce a continuous (free of jumps) circular sequence of equally spaced locations (images) spaced by $\Omega$ and, by properly choosing the ratio $$\frac{\Omega'}{\Omega} = \frac{Q_0'}{Q_0}$$

the sequence becomes periodic. That is, the sequence repeats itself from each period (the length of the circle) to the next. In particular, by choosing for this ratio an integer value p, the number of images in each period becomes equal to p, as shown by insert (A) of FIG. 5. In this case $$\Omega'=p\Omega \quad (17)$$

and therefore p consecutive images (spaced by $\Omega$) exactly cover one cycle (the length $\Omega'=P_5 P_6$ of the circle) thus causing each cycle to reproduce periodically the same p locations of the previous cycle. More generally, let $$\Omega' = \left(p - \frac{1}{r}\right)\Omega \quad (18)$$

with r a positive integer. Then the sequence of images becomes periodic with period $$r\Omega'=(rp-1)\Omega, \quad (19)$$

showing that each period comprises r cycles of the output stage, and it includes a total of rp−1 cycles of the input stage. Thus, since each period exactly comprises rp−1 stationary images, and all other images are produced at the same rp−1 locations, the entire sequence of characteristic frequencies is transferred to these r−1 locations, as pointed out earlier. In other words, by neglecting the frequency dependence of $\Omega'$, $\Omega$ the router is periodic, with each free-spectral range including rp−1 images. FIGS. 4, 5 show two examples, obtained respectively for p=5, r=6 and p=5, r=2. Note, in view of condition (14) the above conditions (17, 18) are equivalent to conditions (10,6).

Note the above derivation ignored the frequency dependence of the two parameters $\Omega'$ and $\Omega$, which are respectively determined by the central zone widths ($P_1 P_2$ and $P_5 P_6$) of the two stages. However, condition (14) (which is very accurate) implies that the ratio $\Omega'/\Omega$ is frequency independent, and therefore (18) is valid in general. Indeed, it is equivalent to condition (13), since according to equation (14) the ratio $\Omega'/\Omega$ is equal to $\Delta f'/\Delta f$. On the other hand, as pointed out earlier, a consequence of the frequency dependence of $\Omega'$ and $\Omega$ is that the waveguides in FIGS. 3-5 are not uniformly spaced. Moreover, although the central transmission coefficient is periodic, the other transmission coefficients are only approximately periodic.

As pointed out earlier, the output waveguides in FIG. 3 are all characterized by the same order $Q_0'$ of the output grating and, as a consequence, the output waveguides spacing $S \approx \Omega$ is much larger than the width w of each waveguide. Instead, in FIGS. 4, 5, the output waveguides now includes several interleaved sets, characterized by different orders of the output router. The number of waveguides is therefore substantially increased and, at the same time, the waveguide spacing is correspondingly reduced. An important property of the new arrangement is that adjacent channels (centered at two consecutive frequencies $f_i$) are now transmitted to widely spaced waveguides and therefore crosstalk previously caused (in FIG. 1, between adjacent channels, by mutual coupling between adjacent waveguides) is essentially eliminated.

Router with Very Large Number of Channels

Figure 6:
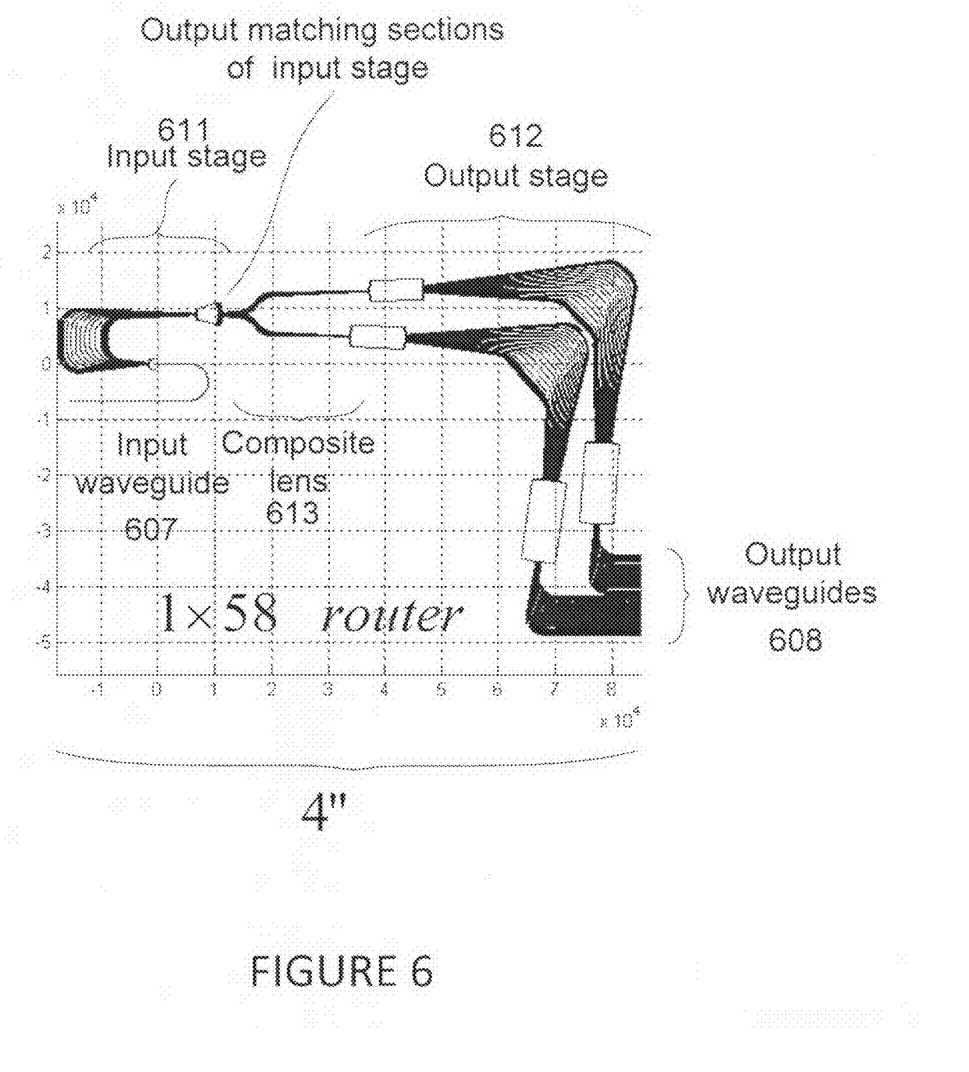
FIG. 6 shows the layout of a 1×58 device characterized by p=5, r=6 and channel spacing of 200 GHz. The composite waveguide lens 613 has two separate output apertures, and the output stage 612 includes two waveguide grating routers, each connected to one of the two apertures.

If the required number N of waveguides is very large, it is advantageous to include in the output stage two gratings, as shown previously (U.S. Pat. No. 7,283,700 B2, issued on Oct. 16, 2007) and illustrated in FIG. 6, showing the mask layout of a 1×58 router. The output stage is now a combination of two waveguide gratings, and it is connected to the input stage by a composite lens, as shown in FIG. 6. As in FIG. 4, the input aperture of the waveguide lens again covers the entire central zone of the input stage. However, now the lens is characterized by two separate apertures, respectively connected to the focal circles of the two output gratings. In this case the frequency response of the router alternates between the two output gratings and therefore the router produces, in each cycle of the input stage, two separate images that are respectively transmitted by the lens to the two output gratings. In the example of FIG. 6 the router is characterized by $\lambda_0 = 1550$ nm, p=5, r≈6 and input channel spacing of 200 GHz. Thus, each output grating in this case includes 6 interleaved sets of output waveguides. The above example assumes an effective refractive index contrast of 0.6%. Notice only some of the arms in each grating are included for better clarity.

In the above example, the number of waveguides is simply equal to the total number of images and therefore, since each output grating produces pr−1 stationary images, the total number of waveguides is 2(pr−1)=58. In practice, however, a smaller number may be included for the following reason. As pointed out earlier, the efficiency (the image intensity) in the output central zone of FIG. 1 is a function of the image distance from the focal point F, and its variation is determined by the radiation characteristics of the periodic array 104. As a consequence, maximum efficiency is only obtained in a central region smaller than the central zone, and the output waveguides are generally located in this region of maximum efficiency. It is therefore important to maximize the width of this region by including suitable transitions in the periodic array. Then, by using the transitions described in U.S. Pat. No. 7,068,888 issued on Jun. 27, 2006, and U.S. Pat. No. 6,873,766 issued on Mar. 29, 2005, the width of the above central region will typically vary between 50% and 80% of the central zone. It is therefore advantageous in FIGS. 3-5 to include the above transitions in the output periodic arrays of both stages. This will improve the efficiency and flatness of each transmission coefficient, and it will also increase, at the output of the router, the central region of nearly maximum efficiency. Then, by only including the output waveguides in the above central region, the total number N of waveguides becomes equal to $N = \gamma 2(pr-1)$ with $0.5 < \gamma < 0.8$.

Different Designs

The particular design illustrated in FIGS. 4-6 can be modified in several ways, without changing the substance of the results, as discussed next.

So far it was assumed that the two stages in FIGS. 3,4,5 have the same center frequency $f_0$, in which case the output waveguides include a central waveguide located at the output focal point $F_3$, and the router then includes an odd number N of output waveguides. More generally, however, an even number N may be preferable, in which case the central frequency of the output stage must be shifted by $\Delta f'/2$, with respect to that of the input stage. Note, moreover, that condition (6) was derived assuming an integer value of r. This particular choice may be advantageous for some applications, since the router transmission coefficients are then approximately periodic. More generally, however, r need not be exactly an integer, and it can be negative. On the other hand, $Q_0$ must be an integer, and therefore the ratio $Q_0'/r$ must be an integer in equation (6).

Note condition (6) implies that r consecutive cycles of the input router essentially produce a total of rp−1 images spaced by S/p. On the other hand, instead of using r consecutive cycles, it may be advantageous to use r+1 cycles. Then the router will include r+1 sets of output waveguides, again spaced by S/p, but the first and last set will each comprise a smaller number of waveguides, so as to produce again a total number of waveguides equal to rp−1.

What is claimed is:

1. A planar optical imaging arrangement comprising an input stage, an output stage, and a waveguide lens connected between the two stages;
   the input stage is a waveguide grating router connected to the input aperture of the lens;
   the output stage is a waveguide grating router connected to the output aperture of the lens;
   at least one input waveguide is connected to the input stage;
   a plurality of output waveguides are connected to the output stage;
   the input stage and the output stage are substantially characterized by opposite dispersions, so that each frequency channel transmitted to a particular output waveguide is substantially characterized by a maximally flat response; wherein:
   the output stage includes several interleaved sets of output waveguides, wherein each set receives a set of frequency channels all produced by the same order of the output stage; and, adjacent output waveguides receive different orders of said output stage.

2. The planar optical imaging arrangement as recited in claim 1 wherein the spacing of the output waveguides is less than twice the width of each waveguide.

3. The planar optical imaging arrangement as recited in claim 1 wherein at least two frequency channels are transmitted to the same output waveguide by different orders of the output stage.

4. A planar optical imaging arrangement comprising an input stage, an output stage, and a composite lens connected between the two stages;

the composite lens is a waveguide arrangement characterized by a single input aperture and two separate output apertures;
the input stage is a waveguide grating router connected to the input aperture of the lens;
the output stage includes two waveguide grating routers, each connected to one of the two output apertures of the lens;
at least one input waveguide is connected to the input stage;
a plurality of output waveguides are connected to each output router;
the input stage and the output stage are characterized by opposite dispersions, so that each frequency channel transmitted to a particular output waveguide is substantially characterized by a maximally flat response; wherein:
each output router includes several interleaved sets of output waveguides, wherein each set receives a set of frequency channels all produced by the same order of the output router; and, adjacent output waveguides of each output router receive different diffraction orders of said output router.

\* \* \* \* \*